United States Patent
Hold et al.

(10) Patent No.: US 9,568,101 B2
(45) Date of Patent: Feb. 14, 2017

(54) SEALING CONFIGURATION FOR SEALING A RECIPROCATING PISTON ROD OF A PISTON COMPRESSOR

(71) Applicant: HOERBIGER KOMPRESSORTECHNIK HOLDING GMBH, Vienna (AT)

(72) Inventors: Christian Hold, Bisamberg (AT); Tino Lindner-Silwester, Vienna (AT); Christian Kernbichler, Enzersdorf an der Fischa (AT); Bernhard Spiegl, Vienna (AT)

(73) Assignee: Hoerbiger Kompressortechnik Holding GmbH, Vienna (AT)

( * ) Notice: Subject to any disclaimer, the term of this patent is extended or adjusted under 35 U.S.C. 154(b) by 259 days.

(21) Appl. No.: 14/405,028

(22) PCT Filed: May 29, 2013

(86) PCT No.: PCT/EP2013/061004
§ 371 (c)(1),
(2) Date: Dec. 2, 2014

(87) PCT Pub. No.: WO2013/182456
PCT Pub. Date: Dec. 12, 2013

(65) Prior Publication Data
US 2015/0337960 A1    Nov. 26, 2015

(30) Foreign Application Priority Data

Jun. 4, 2012 (AT) .................................. 50218/2012

(51) Int. Cl.
*F16J 15/00*    (2006.01)
*F16J 15/40*    (2006.01)
*F16J 15/44*    (2006.01)

(52) U.S. Cl.
CPC ............. *F16J 15/002* (2013.01); *F16J 15/406* (2013.01); *F16J 15/441* (2013.01)

(58) Field of Classification Search
CPC ......... F16J 15/002; F16J 15/441; F16J 15/406
(Continued)

(56) References Cited

U.S. PATENT DOCUMENTS 2,191,265 A * 2/1940 Wheeler ................... F16J 15/28
                                                                               277/546
2,714,028 A * 7/1955 Lyddon .................... F16J 15/30
                                                                               277/546
(Continued)

FOREIGN PATENT DOCUMENTS

| | | |
|---|---|---|
| GB | 1448530 | 9/1976 |
| JP | 62-251575 | 11/1987 |
| WO | 2011062484 | 5/2011 |

OTHER PUBLICATIONS

English Abstract of JPS62251575.

*Primary Examiner* — Thomas E Lazo
(74) *Attorney, Agent, or Firm* — Dykema Gossett PLLC

(57) ABSTRACT

High temperatures of the sealing medium occur in a hydraulic sealing medium barrier for sealing a piston rod of a piston compressor, and there is the risk of soil and abrasion being deposited there and interfering with the function of the seal. To prevent this, a sealing configuration (1) which is provided for circulating sealing medium through an outlet line (11) for sealing medium which is connected to the recess (10), and a circulating device (13) is provided, with which the sealing medium is circulated through the recess (10) while maintaining the pressure ($p_{oil}$) of the sealing medium through the inlet and the outlet line (7, 11).

9 Claims, 4 Drawing Sheets

Figure 1:
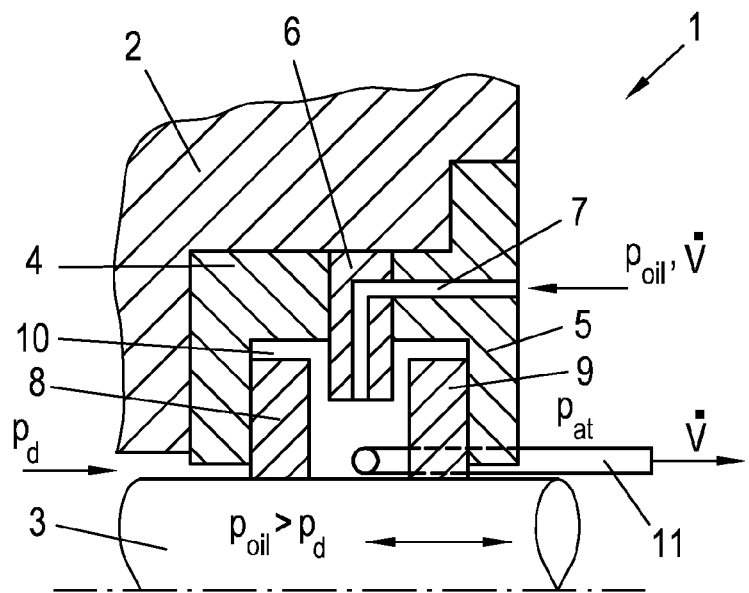

(58) Field of Classification Search
USPC .......................................................... 92/165 R
See application file for complete search history.

(56) References Cited

U.S. PATENT DOCUMENTS

| | | | | |
|---|---|---|---|---|
| 3,216,651 A | * | 11/1965 | King | F16J 15/008 |
| | | | | 277/558 |
| 3,271,037 A | * | 9/1966 | Hammond | F16J 15/441 |
| | | | | 277/544 |
| 3,542,374 A | * | 11/1970 | Neilson | F04B 39/041 |
| | | | | 277/544 |
| 3,544,118 A | * | 12/1970 | Klein | F16J 15/006 |
| | | | | 277/447 |
| 3,860,270 A | * | 1/1975 | Arnold | F16L 17/10 |
| | | | | 277/605 |
| 4,093,239 A | * | 6/1978 | Sugahara | F02F 11/00 |
| | | | | 277/514 |
| 4,206,928 A | | 6/1980 | Asano | |
| 4,222,575 A | * | 9/1980 | Sekiguchi | F16J 15/40 |
| | | | | 277/514 |
| 4,350,349 A | | 9/1982 | McTavish | |
| 5,209,495 A | * | 5/1993 | Palmour | F04B 53/164 |
| | | | | 277/500 |
| 5,772,216 A | * | 6/1998 | Bredemeyer | F16K 41/003 |
| | | | | 277/318 |
| 6,286,837 B1 | * | 9/2001 | Humphrey | F16J 15/28 |
| | | | | 277/435 |
| 6,439,578 B1 | | 8/2002 | Radcliffe | |
| 6,481,720 B1 | * | 11/2002 | Yoshida | B63H 23/321 |
| | | | | 277/400 |
| 6,932,351 B1 | * | 8/2005 | Mowll | F04B 39/00 |
| | | | | 277/512 |
| 9,027,934 B2 | | 5/2015 | Lindner-Silwester et al. | |
| 2011/0298183 A1 | * | 12/2011 | Lindner-Silwester | F04B 39/0022 |
| | | | | 277/500 |
| 2012/0211945 A1 | | 8/2012 | Lindner-Silwester et al. | |

* cited by examiner

SEALING CONFIGURATION FOR SEALING A RECIPROCATING PISTON ROD OF A PISTON COMPRESSOR

The present invention relates to a sealing configuration for sealing a reciprocating piston rod of a piston compressor having a first and a second sealing element, which are provided in a recess in the sealing configuration with an axial distance between them, an inlet line connected to the recess being provided in the sealing configuration for a pressurized sealing medium, and the pressure of the sealing medium being greater than the pressure to be sealed and the sealing elements being provided, so that each one is in contact with an axial end of the recess and with the piston rod under the pressure of the sealing medium, so that the sealing medium is enclosed in the recess with the pressure due to the sealing elements.

In a piston compressor, the space having a high pressure, for example, the working pressure in the cylinder of the compressor, is to be sealed with respect to a space having a low pressure, such as atmospheric pressure, for example, sealing it along the piston rod in the crankcase of the compressor. To this end, so-called pressure packings, which are known, are used to form a seal between the reciprocating piston rod of the piston compressor and a stationary machine part, usually the compressor housing. Such a tight packing usually comprises a plurality of packing rings and/or packing ring combinations provided one after the other axially. Combinations of a radial cut packing ring and a tangential cut packing ring are used most often, as described in EP 1 146 264 A2, for example. In addition, segmented ring designs, in which a packing ring is assembled from a plurality of ring segments, are also used, such as those known from U.S. Pat. No. 4,350,349 A, for example. However, such seals do not form 100% tight systems but instead always have a certain leakage, which escapes through the seal. To reduce the problem of leakage, WO 2010/079227 A1 has already proposed using two sealing elements situated with an axial distance between them as the seal, with a sealing medium, for example, oil, being introduced between them at a high pressure, thereby pressing the sealing elements against the sealing surfaces provided in the sealing packing to form the seal. This creates a sealing medium barrier, which at least reduces the leakage of the working medium of the compressor, for example, air or natural gas, along the piston rod, even eliminating it in the ideal case.

Such sealing packings or seals are normally also cooled, for example, by circulating a cooling medium through the sealing packing to cool the piston rod indirectly through the cooing of the sealing packing. However, this naturally also causes additional structural complexity and operating expense.

Similar seals are also known for sealing the piston rod of a Stirling engine, e.g., as described in U.S. Pat. No. 4,222, 575 A or DE 28 39 243 A1. Leakage return, in which unwanted leakage of sealing medium can be returned back to a sealing medium reservoir in a pressureless process, is also provided.

WO 2011/062484 A1 discloses a seal for a rotor shaft of a ship's propeller, in which two pressure chambers through which a sealing medium is circulated are provided. However, the pressure of the sealing medium in the pressure chamber is lower than the pressure to be sealed. The two pressure chambers used different sealing media, with the pressure in the two pressure chambers being determined by the pressure of a supplied sealing medium and a throttle. Pumps in the sealing media circulation systems serve to recirculate the sealing medium.

However, a seal in the form of a sealing medium barrier also has certain problems in addition to unavoidable leakage of sealing medium. Because of the low sealing medium volume in the sealing medium barrier, the sealing medium easily reaches temperatures up to 200° C. or even higher due to friction-induced heat input (caused by the friction between the sealing medium and the piston rod moving rapidly back and forth). The choice of possible sealing media to be used is therefore limited from the beginning. Due to the high temperatures, there is also rapid thermal aging of the sealing medium, so that the sealing function may suffer. Due to the increase in temperature, however, there is an increase in pressure in the seal at the same time, which may result in increased leakage of sealing medium out of the seal in an undesirable manner. In addition, due to the increased pressure, the sealing elements of the sealing medium barrier are naturally also under an excessive burden, which can ultimately result in failure of the sealing elements. In addition, in the standard embodiment, hydraulic components are designed only to withstand temperatures of typically up to 80° C. Hydraulic components, which control higher temperatures, in particular such high temperatures as those possible here, are expensive accordingly. In addition, these high temperatures also necessitate adequate cooling of the seal. Not least of all, soil due to abrasion or process-related dirt, for example, can also collect in the seal and impair the function of the seal.

One object of the present invention is therefore to eliminate the aforementioned problems with sealing medium barriers as the seals in a piston compressor.

This object is achieved according to the present invention by providing an outlet line for the sealing medium, which is connected to the recess, and also a circulation device is provided, which circulates the sealing medium through the recess by means of the inlet and outlet, while maintaining the pressure of the sealing medium. Due to the circulation of sealing medium through the recess, care is taken to ensure that, without impairing the sealing function, the temperature of the sealing medium is kept within a reasonable range, so that the problems associated with this, such as an increase in pressure in the seal, thermal aging of the sealing medium and cooling of the sealing configuration are at least greatly reduced. Furthermore, this also removes any soiling from the seal, so that problem-causing deposits of dirt or abrasion are also reduced. However, the fact that this can eliminate the cooling of the sealing configuration, while the piston rod is cooled directly at the same time, may be regarded as another substantial benefit of this circulation, which was possible in the past only through complex designs.

The desired pressure of the sealing medium can be adjusted easily if a pressure regulating unit is provided in the outlet line.

To prevent a backflow of working medium of the compressor into the sealing medium tank when the compressor is at a standstill and/or in case of a malfunction, a first and/or a second cutoff valve may be provided in the outlet line and may also be used for venting the seal.

If a prestressed nonreturn valve is provided in the inlet line, it is easy to prevent working medium of the compressor from flowing back into the sealing medium tank in the event of a problem or when the system is shut down.

A vent line can be opened and closed automatically when the second cutoff valve is operated by the pressure upstream from the prestressed nonreturn valve. Thus however, it is also possible to prevent sealing medium from being lost through the vent line.

Temperature control of the hydraulic system can also be implemented easily by providing a temperature sensor in the outlet line, and connecting the sensor to a regulating unit for regulating the circulating device. The temperature of the sealing medium can be regulated and/or limited at the upper end.

The pressure of the sealing medium can also be regulated by providing a pressure sensor in the outlet line, which is connected to a regulating unit for regulating the circulating device. Thus, through appropriate setpoint inputs, it is readily possible to set different sealing medium pressures.

To be able to set two operating modes, e.g., standstill and normal operation, a switching valve may be provided in the outlet line, acting upon a first pressure limiting valve or a second pressure limiting valve, setting a higher switching pressure for the first pressure limiting valve than for the second pressure limiting valve. In this way, a higher sealing medium pressure can be set in the sealing configuration when the compressor is at a standstill, for example, in order to reliably suppress outflow of working medium of the compressor through the sealing configuration.

A cooling system, which is optionally provided for the sealing configuration, may easily be used if a cooling line, which is connected to a cooling system of the sealing configuration, branches off from the inlet line. Thus the sealing configuration and indirectly also the piston rod may additionally be cooled by the sealing medium, but at the same time additional external units for circulating a separate cooling medium may be omitted.

Figure 2:
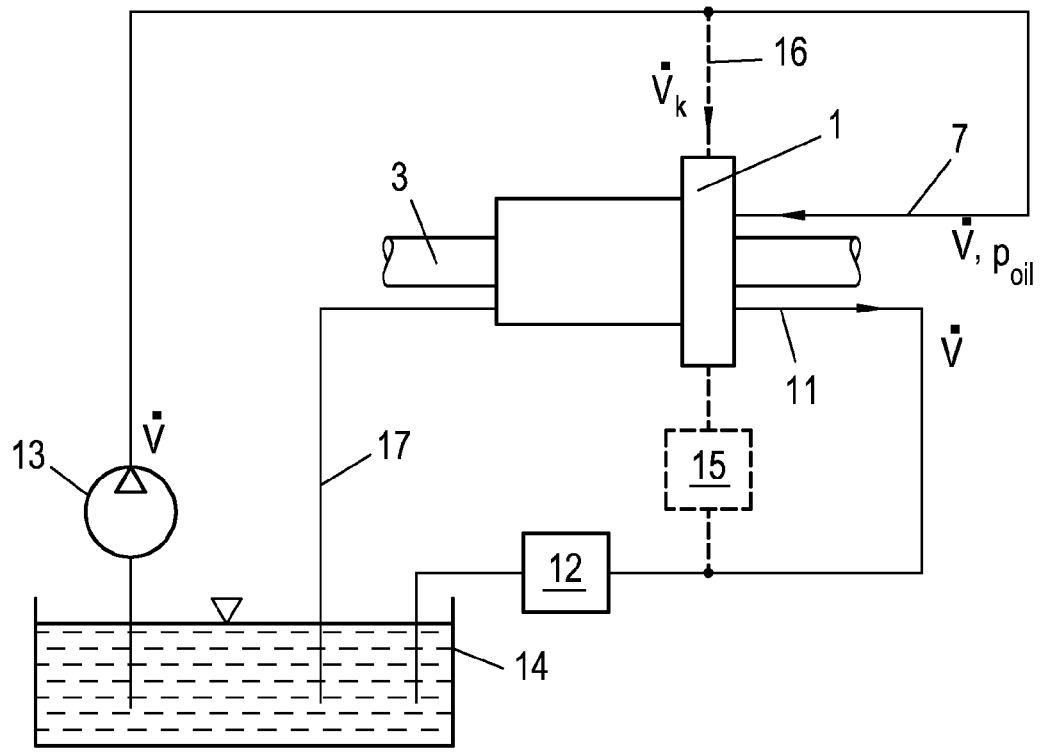
Figure 3:
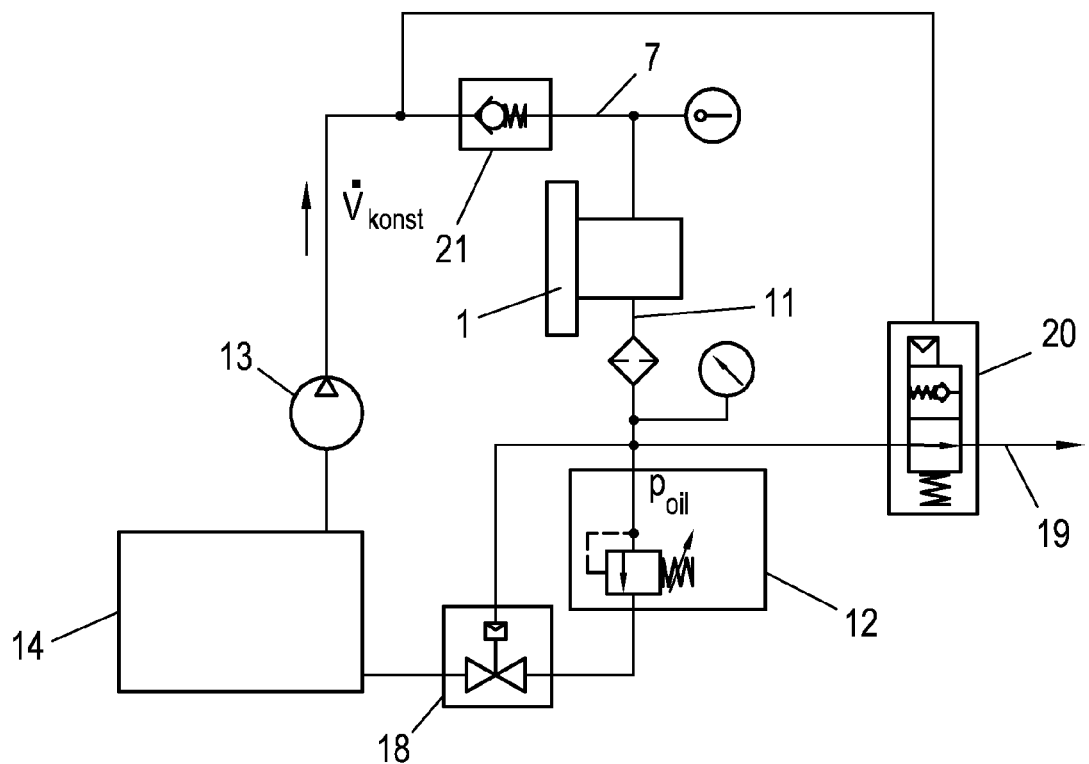
Figure 4:
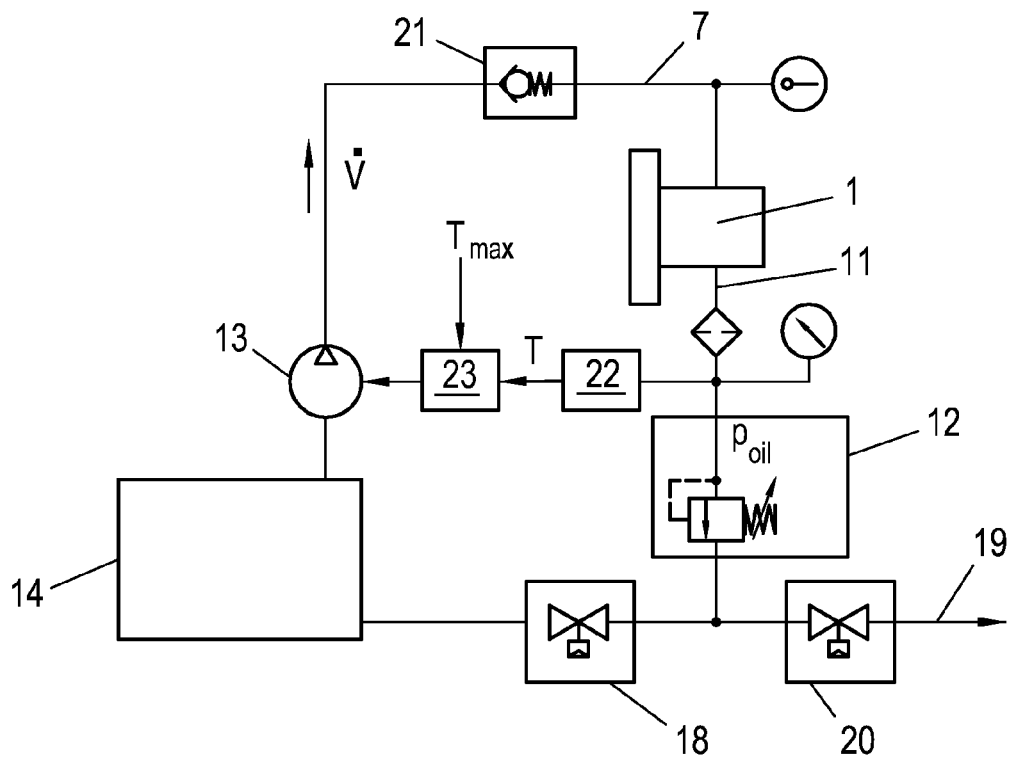
Figure 5:
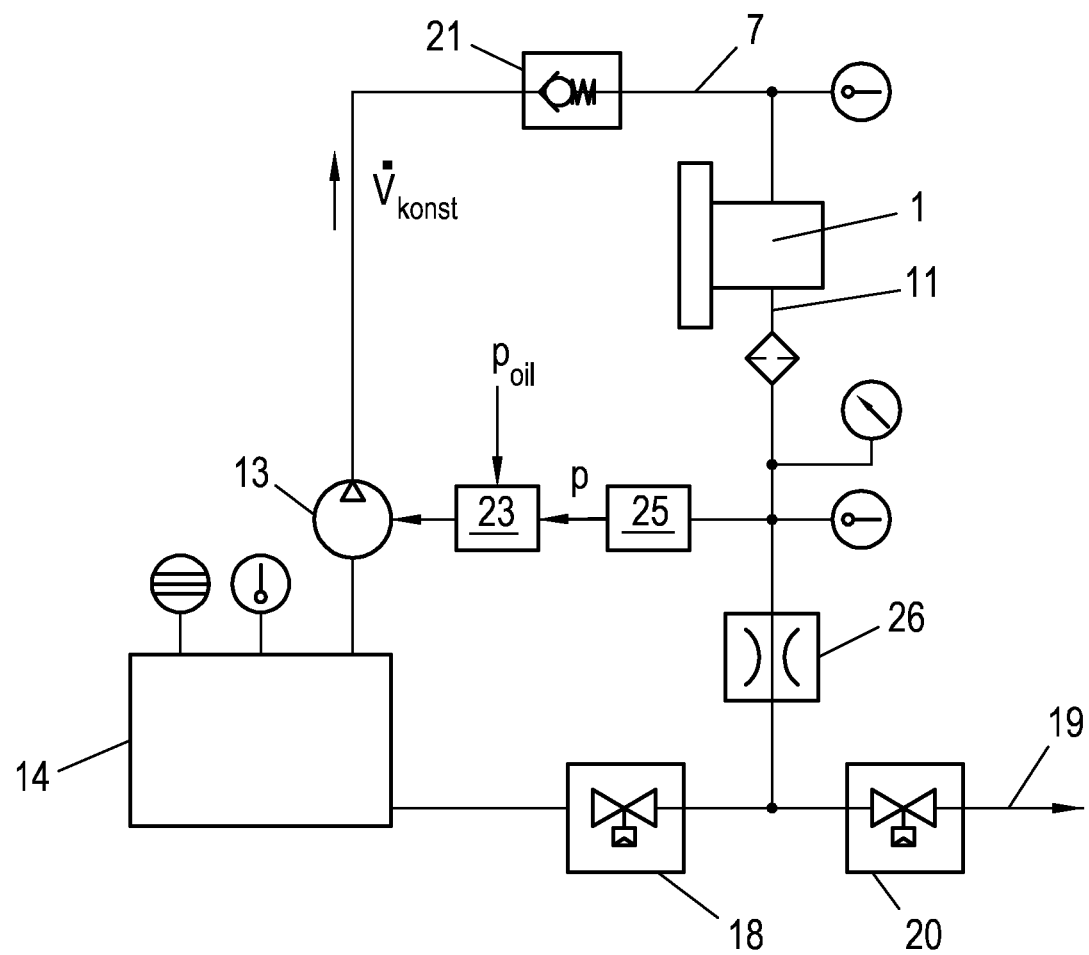
Figure 6:
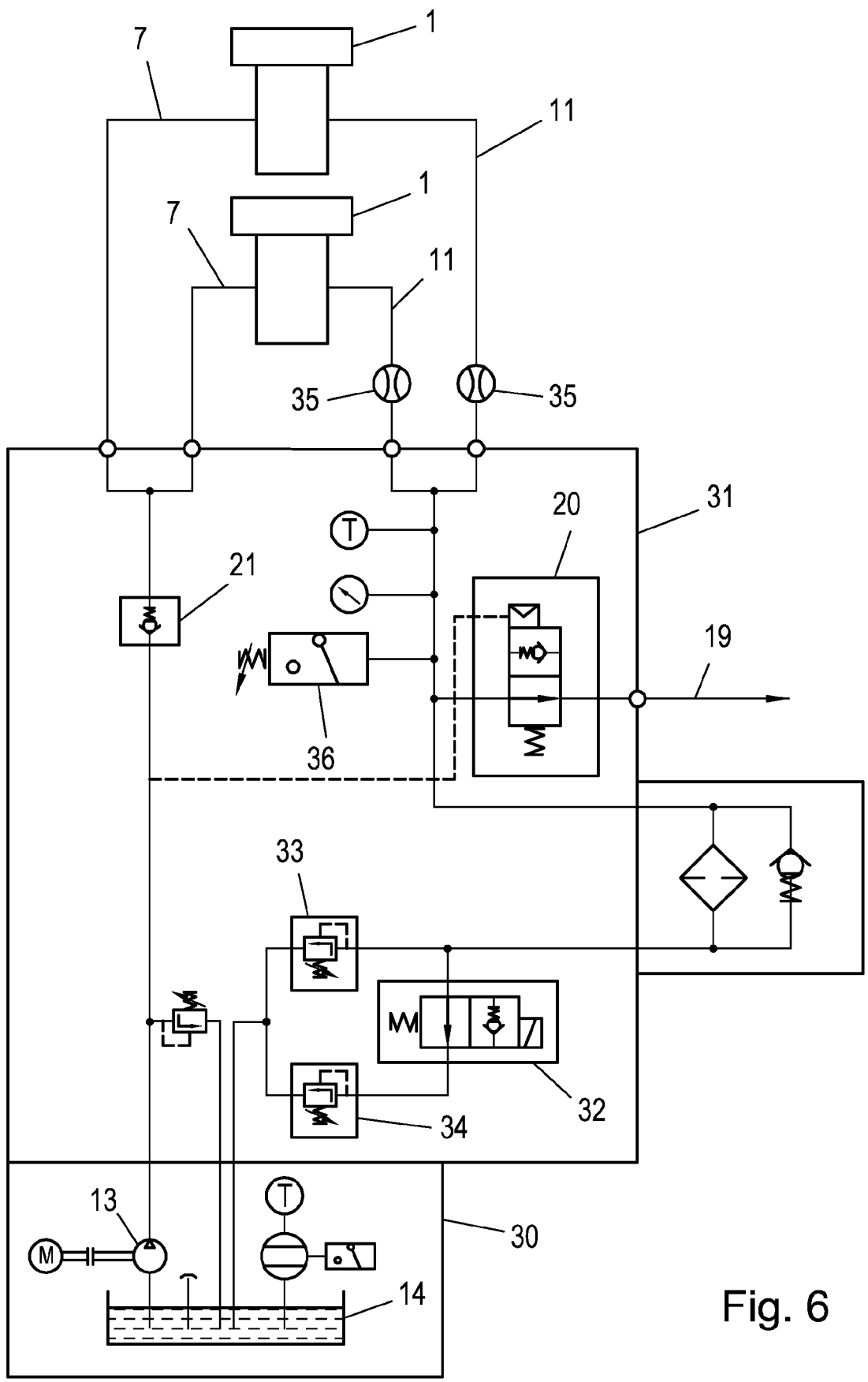

The present invention is explained in greater detail below with reference to the exemplary schematic FIGS. 1 through 6, which are not restrictive in any way and in which:

FIG. 1 shows a sealing configuration according to the invention with circulation of the sealing medium, FIG. 2 shows a hydraulic diagram of the circulation of the sealing medium, FIG. 3 shows a hydraulic diagram with a constant volume flow, FIG. 4 shows a hydraulic diagram with the volume flow adjusted to the temperature, FIG. 5 shows a hydraulic diagram with the volume flow adjusted to the pressure and FIG. 6 shows a hydraulic diagram for two sealing configurations.

FIG. 1 shows a known sealing configuration 1 for sealing a reciprocating piston rod 3 of a piston compressor as a function of a pressure $p_d$ of a working medium, for example, the cylinder pressure. The sealing configuration 1 is provided in a stationary housing part 2 of the compressor, for example, the compressor housing, and forms a seal between this housing part 2 and the moving piston rod 3. The sealing configuration 1 is inserted into the housing part 2 in a premounted state, for example, as is adequately well-known, and is secured there by means of a number of screws distributed around the circumference, for example. The sealing configuration 1 in the example shown here comprises two L-shaped chamber disks 4, 5, which are separated axially by a dividing disk 6 in the exemplary embodiment depicted here. However, other embodiments, for example, with T-shaped dividing disks, are naturally also conceivable. A flange may be provided on the chamber disk 5 on the outside radially, by means of which the sealing configuration 1 can be secured on the housing part 2. The chamber disks 4, 5 and optionally the dividing disk 6 may be held together by bolts passing through them in a known way. Due this configuration, a recess 10 is formed between the L-shaped chamber disks 4, 5, optionally the dividing disk 6 and the piston rod 3. A first and a second sealing element 8, 9 are provided in this recess 10, so that the sealing elements 8, 9 are each in contact with the axial ends of the recess 10, i.e., the radial legs of the L-shaped chamber disks 4, 5, due to the acting pressure of a sealing medium supplied into the recess 10 through an inlet line 7 and are provided with a distance between them, so that they are separated axially from one another (the orientations "axial" and "radial" are based on the orientation of the piston rod 3). The first and second sealing elements 8, 9 are provided on the outside radially at a distance from the chamber disks 4, 5, i.e., from the axial legs of the chamber disks 4, 5, and are in contact with the piston rod 3, with the sealing surface on the inside radially. The sealing medium, such as an oil, for example, is supplied under a pressure $p_{oil}$, which is greater than the pressure $p_d$ to be sealed, is supplied into the recess 10. The sealing medium is thus enclosed in the recess 10 by the sealing element 8, 9 and acts radially outwardly and axially on the sealing elements 8, 9, which are thus pressed by the pressure $p_{oil}$, radially inwardly against the piston rod 3 and axially against the chamber disks 4, 5 to form a seal. This creates a sealing medium barrier, which prevents leakage of the gaseous working medium of the compressor to be sealed.

Either known hydraulic sealing rings, such as, for example, a lip sealing ring or a compact sealing ring, having a sealing lip in contact with the piston rod 3, or rigid, cut or segmented packing rings or packing ring combinations, which are also sufficiently well-known, such as a combination of a radial cut packing ring with a tangential cut packing ring, for example, may be used as sealing elements 8, 9. It is known that hydraulic sealing rings may also be designed, so that the sealing medium, which is pressed through the sealing lip in one stroke, is "sucked back" through the sealing lip in the opposing stroke, so that, on the, whole, there is little or no leakage of sealing medium through the hydraulic sealing ring. In the use of packing rings or packing ring combinations, there is usually a slight leakage of sealing medium through the seal, but this does not usually constitute a problem.

The sealing configuration 1 could of course also have a different design or be made of other and/or additional components, such as those described in detail in WO 2010/079227 A1 or AT 510171 A1, for example.

An outlet line 11 through which the sealing medium can be drained out of the recess 10 may be connected to the recess 10. The outlet line 11 is preferably but not necessarily provided diametrically opposite the mouth of the inlet line 7 into the recess 10 to achieve a good flow through the recess 10. A plurality of inlet lines 7 and/or outlet lines 11 may of course also be provided. Thus sealing medium can be circulated through the recess 10, as illustrated in greater detail on the basis of FIG. 2, for example.

A sealing medium flow V̇ is supplied to the sealing configuration 1 through the inlet line 7 and removed through the outlet line 11 by a circulating device, here for example a circulating pump 13. The sealing medium is circulated through a sealing medium tank 14, from which the circulation pump 13 draws sealing medium and into which the sealing medium is returned. The pressure $p_{oil}$, required for the seal is adjusted by a pressure regulating unit 12.

The circulation of sealing medium through the sealing configuration 1, more specifically through the recess 10, ensures that the temperature of the sealing medium does not rise too high, on the one hand. In addition, there is also direct cooling of the piston rod 3 as a result because sealing medium is circulating around the piston rod 3. This yields a substantial additional benefit when a complex cooling of the sealing configuration 1 may be omitted due to the direct cooling of the piston rod 3. Likewise, any soil can be washed out of the recess 10 by this circulation and/or deposits of process-related abrasion or soil in the recess 10 can be suppressed.

In another embodiment variant, the sealing configuration 1 could additionally also be cooled by means of a cooling sealing medium flow $\dot{V}_K$, which is diverted from the sealing medium flow $\dot{V}$ and is supplied through a cooling line 16 to the sealing configuration 1, as indicated with dotted lines in FIG. 2. To do so, a device 15 for regulating the cooling sealing medium flow $\dot{V}_K$, such as a pressure regulating device or a volume flow-regulating device, for example, could also be provided upstream or downstream from the sealing configuration 1. Thus, any cooling system that might be available for the sealing configuration 1 could be used, but the external units provided for circulating a separate cooling medium are eliminated. This may be of interest in retrofitting an existing compressor in particular.

In the embodiment according to FIG. 3, the circulation takes place with a constant sealing medium flow $\dot{V}_{const}$. The pressure $p_{oil}$, required for the seal is set by means of the pressure regulating unit 12, which in this case is an adjustable pressure limiting valve, for example. Such a sealing configuration 1 is operated at a pressure $p_{oil}$=30-250 bar, for example, and a sealing medium flow $\dot{V}_{const}$ of 300 L/day to 1500 L/day.

In addition, a first cutoff valve 18 such as a closable nonreturn valve or a hydraulically operated ball valve, such as the one used here, may also be provided in the return line to the sealing medium tank 14 in order to suppress the return flow of gas into the sealing medium tank 14 in the event of a problem. To do so, the cutoff valve 18 is triggered via a control line, e.g., such as that starting from the outlet line 11 here. If there is no pressure $p_{oil}$ in the outlet line 11, then the cutoff valve 18 closes automatically. However, the cutoff valve 18 may also be omitted because the pressure regulating unit 12 can also assume this function. The pressure regulating unit 12 closes automatically at very low pressures and prevents gas leaks from flowing back into the sealing medium tank 14.

Likewise, a vent line 19 may also be provided in the outlet line 11 with a second cutoff valve 20 such as, for example a cutoff nonreturn valve as in the present case or a hydraulically controlled ball valve may be provided in the vent line. To this end, the second cutoff valve 20 is triggered by means of a control line, such as starting from the inlet line 7 here, for example. If no pressure $p_{oil}$, is applied in the inlet line 7, the second cutoff valve 20 will open to dissipate the leakage gas. The gas venting pressure is preferably lower than 4 bar. The vent line 19 may also simply be directed outdoors but may also be connected to flare lines, for example, to flare off the leakage gas.

Furthermore, a prestressed nonreturn valve 21 may also be provided in the inlet line 7 to close the inlet line 7 at a certain pressure $p_{oil}$. The prestressed nonreturn valve 21 preferably has two functions. First, it prevents working medium of the compressor from flowing back into the sealing medium tank 14 in the event of a problem or in the shutdown state. Secondly, it may be used to create a pressure in the control line of the cutoff valve 20, which branches off from the inlet line 7 in the direction of flow upstream from the nonreturn valve 21 to create this pressure when the hydraulic unit is turned on, this hydraulic unit actuating the cutoff valve 20, i.e., closing it before the sealing medium can reach the cutoff valve 20. If the cutoff valve 20 were not yet closed, sealing medium with escape through the open vent line 19. It is therefore advantageous that the nonreturn valve 21 is prestressed. In the event of trouble, i.e., if there is no longer any pressure applied in the inlet line 7, the cutoff valve 20 then opens again automatically and the leakage gas can be dissipated again through the vent line 19 as is the case with traditional packings. A pressure of approx. 5 bar can preferably be adjusted as the activation pressure for the nonreturn valve 21. No separate venting of the sealing medium lines in normal operation is needed due to the circulation of the sealing medium.

The advantage of this embodiment is that the seal is controlled only by way of the hydraulic pressure $p_{oil}$, so that a very robust and simple seal can be implemented.

Likewise, other components, for example manometers, temperature displays, filters, etc. may of course be provided in suitable and/or necessary locations, as shown in FIG. 3.

The embodiment in FIG. 4 differs from that in FIG. 2 essentially in that a constant sealing medium flow $\dot{V}_{const}$ is no longer provided, but instead the sealing medium flow $\dot{V}$ is thermally regulated. Therefore, a temperature sensor 22 is provided on the outlet line 11, sending the data about the prevailing temperature T of the sealing medium at the outlet to a regulating unit 23, which in turn controls the circulating pump 13 to maintain a certain preset temperature of the sealing medium, for example, $T_{max}$=80° C. A hydraulically controlled ball valve, which is controlled by the pressure upstream from the prestressed nonreturn valve 21, for example, is used here as the cutoff valve 20, and the vent line 19 here is provided downstream from the pressure regulating unit 12.

Instead of a temperature control, a pressure control as illustrated in FIG. 5 may also be provided. Therefore, a throttle device 26 such as an aperture is provided in the outlet line 11, and the prevailing pressure of the sealing medium is measured by a pressure sensor 25 in the outlet line 11, for example, and sent to a control unit 23. The control unit 23 controls the circulating pump 13 in such a way that a predefined pressure $p_{oil}$ is achieved in the sealing configuration 1.

FIG. 6 shows an embodiment in which two sealing configurations 1 are supplied with a hydraulic unit but naturally more than two sealing configurations 1 may also be operated by one hydraulic unit. A hydraulic unit 30 here is provided with all the components necessary for the hydraulic supply, and a hydraulic control block 31 is provided with all the hydraulic components required for operation. What is special here is that it is possible to switch by means of a switching valve 32 between normal operation and standstill operation. The switching may take place manually or automatically. Depending on the position of the switching valve 32, a first pressure limiting valve 33 and a second pressure limiting valve 34 are acted upon, the first pressure limiting valve 33 having a higher switch pressure, e.g., 250 bar, than the second pressure limiting valve 34, e.g., 150 bar. Thus, the pressure $p_{oil}$ may be set as a function of the position of the switching valve 32. If the compressor is shut down, then it is possible to switch to standstill operation and thus to the higher pressure $p_{oil}$ in order to reliably prevent working medium from the compressor from being forced into the sealing configuration 1. At a standstill, a pressure increase may occur in the compressor cylinder (up to the final pressure of the compressor) in rare cases, e.g., when the pressure valve of the compressor is leaky. At the standstill of the compressor, the pressure of the sealing medium may be set at the final pressure of the compressor (or higher) to prevent the working medium from being forced into the sealing configuration 1.

Additionally, flow metering units 35 are provided here in the outlet lines 11. Pressure switches may also be provided instead of the flow metering units 35. To prevent a return flow of sealing medium between the sealing configurations, nonreturn valves may also be installed upstream from the flow metering units 35 or pressure switches. Likewise, a pressure switch 36 may be provided in the inlet line to trigger pressure-dependent actions, for example, to stop energizing the drive motor of the circulating pump 13 in the event of a malfunction.

In the case of a sealing configuration 1, as described above, there is a minor leakage of sealing medium through the sealing elements 8, 9 and/or between the sealing elements 8, 9 and the piston rod. This leakage is preferably to be removed from the sealing configuration. A leakage return of sealing medium from the sealing configuration 1, such as that described in AT 510171 A1, for example, could also be returned from the sealing configuration 1 to the sealing medium tank 14 through a leakage line 17, as shown in FIG. 2, for example. Instead of such a leakage line 17, the leakage of sealing medium could also be directed into the crankcase of the compressor. Then an overflow may be provided in the crankcase, and the overflow returned to the sealing medium tank 14.

The invention claimed is:

1. A sealing configuration for sealing a reciprocating piston rod of a piston compressor having a first and a second sealing element, which are provided in a recess in the sealing configuration, with an axial distance between them, whereas an inlet line, which is connected to the recess is provided in the sealing configuration for a sealing medium which is under pressure ($p_{oil}$), and the pressure ($p_{oil}$) of the sealing medium is greater than the pressure ($p_d$) to be sealed, and the sealing elements are each arranged abutting an axial end of the recess and the piston rod because of the pressure ($p_{oil}$) of the sealing medium, so that the sealing medium with the pressure ($p_{oil}$) is enclosed in the recess by the sealing elements, wherein an outlet line is provided for sealing medium, which is connected to the recess, and a circulating device is provided, circulating the sealing medium through the recess via the inlet and outlet lines while maintaining the pressure ($p_{oil}$) of the sealing medium in the recess.

2. The sealing configuration according to claim 1, wherein a pressure regulating unit is provided in the outlet line.

3. The sealing configuration according to claim 1, wherein a first and/or a second cutoff valve is/are provided in the outlet line.

4. The sealing configuration according to claim 3, wherein the second cutoff valve is activated by the pressure upstream from the prestressed nonreturn valve.

5. The sealing configuration according to claim 1, wherein a prestressed nonreturn valve is provided in the inlet line.

6. The sealing configuration according to claim 1, wherein a temperature sensor is provided on the outlet line which is connected to a regulating unit for regulating the circulating line.

7. The sealing configuration according to claim 1, wherein a pressure sensor is provided on the outlet line which is connected to a regulating unit for regulating the circulating device.

8. The sealing configuration according to claim 1, wherein a switching valve, which acts upon a first pressure limiting valve or a second pressure limiting valve, is provided in the outlet line, wherein a higher switching pressure is set for the first pressure limiting valve than for the second pressure limiting valve.

9. The sealing configuration according to claim 1, wherein a cooling line which is connected to a cooling system of the sealing configuration branches off from the inlet line.

\* \* \* \* \*